US006175955B1

(12) United States Patent
Ojennes et al.

(10) Patent No.: US 6,175,955 B1
(45) Date of Patent: Jan. 16, 2001

(54) METHOD FOR RETRIEVING SELECTED DATA VALUES IN A PROCESSOR USING DATA VISIBILITY MACROS

(75) Inventors: Daniel James Ojennes; David L. Neuder, both of Colorado Springs, CO (US)

(73) Assignee: Agilent Technologies, Palo Alto, CA (US)

( * ) Notice: Under 35 U.S.C. 154(b), the term of this patent shall be extended for 0 days.

(21) Appl. No.: 09/127,109

(22) Filed: Jul. 31, 1998

(51) Int. Cl.[7] ....................................................... G06F 9/45
(52) U.S. Cl. ................................................................ 717/4
(58) Field of Search ..................................................... 717/4

(56) References Cited

U.S. PATENT DOCUMENTS

| | | | | |
|---|---|---|---|---|
| 5,450,586 | * | 9/1995 | Kuzara et al. | 395/704 |
| 5,737,520 | * | 4/1998 | Gronlund et al. | 714/39 |
| 5,968,181 | * | 10/1999 | Tomioka | 713/600 |

OTHER PUBLICATIONS

Auslander et al. Fast, Effective Dynamic Compilation. ACM. pp. 149–159, May, 1996.*
Mukherjea et al. Applying Algorithm Animation Techniques for Program Tracing, Debugging, and Understanding. ACM. pp. 456–465, 1993.*
Copperman. Debugging Optimized Code Without Being Misled. ACM. pp. 387–427, 1994.*
Embedded Systems Programming–Aug. 1997; "Debugging With Real–Time Trace" by Dan Ojennes; pp. 50–58.
Hewlett–Packard Journal–Mar. 1983; "A Modular Logic Timing Analyzer For The 64000 System" by Joel A. Zellmer, John E. Hanna, and David L. Neuder; pp. 23–30.
Hewlett–Packard Journal–Feb. 1984; "New Software Increases Capabilities of Logit Timing Analyzer" by David L. Neuder; pp. 32–38.
Hewlett–Packard Journal–Apr. 1991; "A Test Verification Tool For C and C++Programs" by David L. Neuder; pp. 83–92.
Hewlett–Packard Journal–Apr. 1993; "Software Performance Analysis Of Real–Time Embedded Systems" by Andrew J. Blasciak, David L. Neuder, and Arnold S. Berger; pp. 107–115.

* cited by examiner

Primary Examiner—Tariq R. Hafiz
Assistant Examiner—Wei Zhen
(74) Attorney, Agent, or Firm—Patrick J. Murphy

(57) ABSTRACT

A method for retrieving selected, predetermined data values using a logic analyzer and data visibility macros. The predetermined data values result from data operations that occur internally to the target processor. The data visibility macros send the data values via the external bus so that the logic analyzer may retrieve them for display. The data visibility macro is essentially a code marker, the difference being that a data visibility macro is used by the logic analyzer to retrieve data value information.

The present method comprises the steps of inserting a data visibility macro into software code that is resident in the processor, compiling the code, writing the selected data values to an external bus, and using the logic analyzer to retrieve and display the data values.

16 Claims, 2 Drawing Sheets

METHOD FOR RETRIEVING SELECTED DATA VALUES IN A PROCESSOR USING DATA VISIBILITY MACROS

FIELD OF THE INVENTION

The present invention relates generally to test and measurement instruments and more particularly to a method for retrieving selected data values in a processor using a logic analyzer and data visibility macros.

BACKGROUND OF THE INVENTION

As processors have become more and more complex, the data carried by the bus has become further removed from the actual executed code inside the processor. Thus, a logic analyzer that is used to collect bus activity must differentiate between instructions that were actually executed and those instructions that were not. This task is difficult, at best. With the introduction of instruction and data caches in today's processors, tracking code execution at the bus seems illogical.

However, using a software trace technique facilitates the debugging of complex, target processors. Software trace provides the systems developer high-level source code that is correlated to a real-time trace acquired by a logic analyzer. Typically, the logic analyzer will use a disassembler to interpret which bus cycles contain code information. A symbol database is used to correlate the actual source code to the code addresses seen on the target bus. One limitation of this technique is that data operations that occur internally to the processor are not captured by the logic analyzer. Providing the developer with the relevant data operations would enhance the developer's knowledge of the processor during the debug stage of development.

Logic analyzers and related techniques for software debugging are disclosed in U.S. Pat. No. 4,373,193 for LOGIC STATE ANALYZER of George A. Haag, O. Douglas Fogg, Gordon A. Greenley, Steve A. Shepard and F. Duncan Terry; U.S. Pat. No. 4,720,778 for SOFTWARE DEBUGGING ANALYZER of Kevin M. Hall and Daniel A. Schmelzer; U.S. Pat. No. 5,450,586 for SYSTEM FOR ANALYZING AND DEBUGGING EMBEDDED SOFTWARE THROUGH DYNAMIC AND INTERACTIVE USE OF CODE MARKERS of Eric J. Kuzara, Andrew J. Blasciak and Greg S. Parets; and U.S. Pat. No. 5,737,520 for METHOD AND APPARATUS FOR CORRELATING LOGIC ANALYZER STATE CAPTURE DATA WITH ASSOCIATED APPLICATION DATA STRUCTURES of Robert D. Gronlund, Brian A. Willette and William M. Zevin. The foregoing patents are commonly assigned to Hewlett-Packard Company and are hereby incorporated herein by reference for all that they disclose and teach.

SUMMARY OF THE INVENTION

The present invention provides a method for retrieving selected data values in a processor using a logic analyzer and data visibility macros. A data visibility macro is essentially a code marker, the difference being that a data visibility macro is used by the logic analyzer to retrieve data value information.

The present method comprises the steps of inserting a data visibility macro into software code that is resident in the microprocessor, compiling the code, writing the selected data values to an external bus, and using the logic analyzer to retrieve and display the data values. Each data visibility macro comprises a C code source file and a header file. The source file reserves an array of memory to which the data values are written. The header file defines the macros that writes the selected data values.

DETAILED DESCRIPTION OF THE PREFERRED EMBODIMENT

Briefly, the present invention provides a method for retrieving selected, predetermined data values using a logic analyzer and data visibility macros. The predetermined data values result from data operations that occur internally to the target processor. The data visibility macros send the data values via the external bus so that the logic analyzer may retrieve them for display. Data visibility macros are most useful when the target processor has internal cache (i.e., instruction and data caches) that is enabled. Debugging the processor with the cache enabled facilitates the debugging process at expected real-time speeds.

Each data visibility macro comprises a C code source file and a header file. The source file reserves an array of memory to which the data values are written. The header file defines the macros that writes the selected data values. The developer inserts a data visibility macro into code and compiles the macro code into a program. The memory array that is reserved by the source file must be "non-cache able" or write-through memory. This ensures that the predetermined data values are sent across the external bus, making them accessible to the logic analyzer.

Each macro writes to a different offset in the array of reserved memory. Based upon the offset, the logic analyzer may display the data differently. In one preferred embodiment, a first macro will display the data in decimal format. In another preferred embodiment, a second macro will display the data in binary format. The first and second macros each write to a different location in the reserved array so that the logic analyzer knows in which format to display the captured data.

A third macro illustrates one benefit of the data visibility macros of the present invention. The third macro is available to facilitate triggering with the logic analyzer. The developer can set up a very complicated trigger situation using a very straightforward trigger. The logic analyzer simply "watches" for the address of the reserved array on the address bus of the target processor. If the reserved array is present on the address bus, and predetermined data values are seen on the data bus during the same clock cycle, the logic analyzer triggers. The data visibility macro that facilitates this trigger can be nested within several conditional statements so that the logic analyzer will only trigger on a very specific case. All this functionality is available to the developer with a single line of code to be added to their program.

Appendix A lists several of data visibility macros and a brief description. In a preferred embodiment, the data visibility macros are available in the HP E2476A and E2477A preprocessors available from Hewlett-Packard Company, Palo Alto, Calif. These specific preprocessors are geared towards the Motorola ADS target system (the MPC860). The preferred embodiment logic analyzer is the HP 16555A, also available from Hewlett-Packard.

Figure 1:
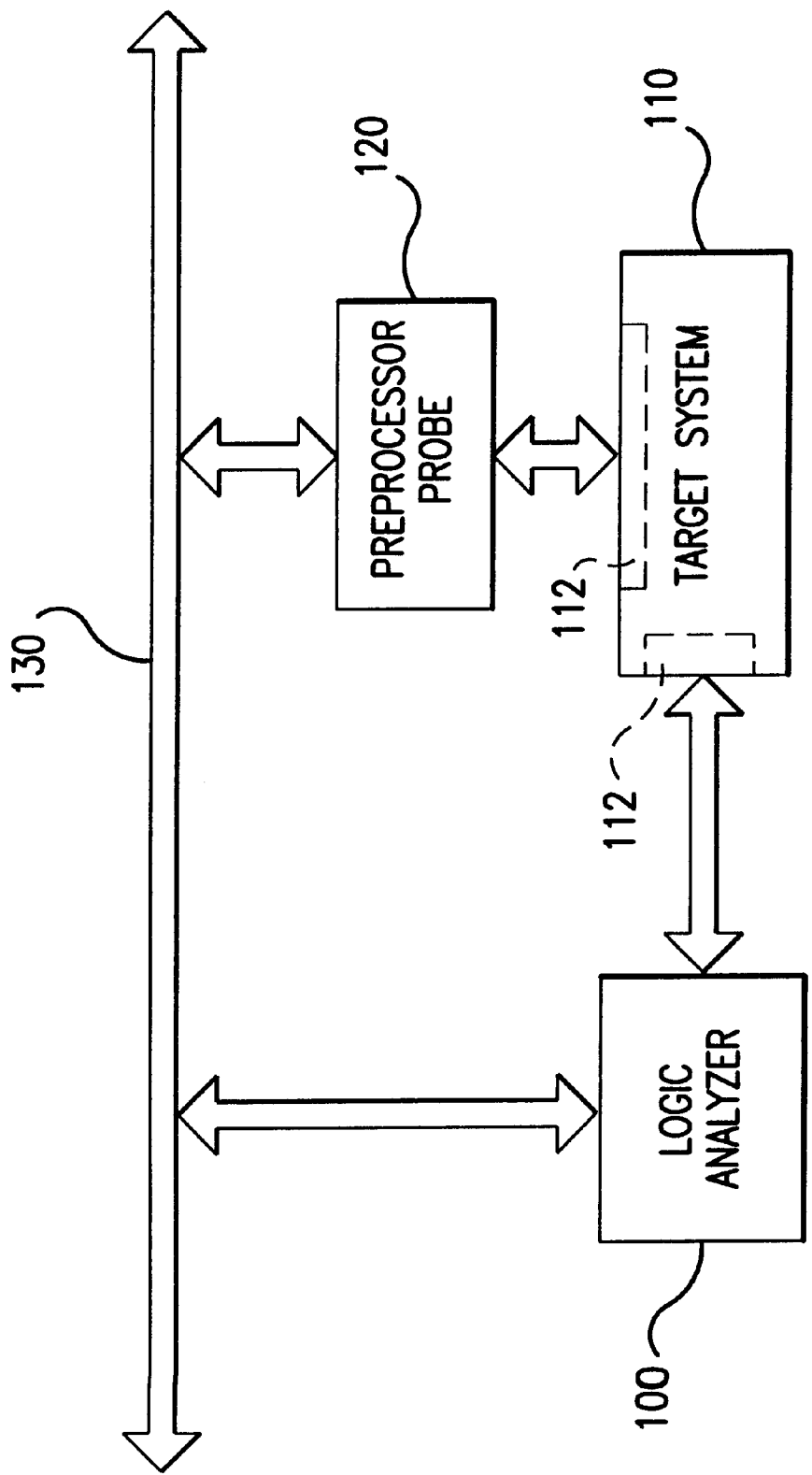
FIG. 1 shows a target system set up for analysis according to the present invention.

Referring now to FIG. 1, wherein a target system is set up for analysis. Logic analyzer 100 is connected to a local area network (LAN) 130 for example. The logic analyzer 100 comprises several software modules, including in one preferred embodiment, a disassembler, a symbol file reader and a software analyzer. The logic analyzer 100 is connected to the target system 110 through a preprocessor 112. A preprocessor probe 120 is also connected to the target system 110 through the preprocessor 112. The probe 120 is then connected to the LAN 130.

Using this configuration, a developer can capture and display predetermined data values resulting from data operations in the target system. The developer must first insert a data visibility macro into code in the target's memory via the logic analyzer's editor. This code is then compiled causing the target system to write the predetermined data values to the external bus via the preprocessor. The logic analyzer can then capture the data values and display them to a display screen.

Figure 2:
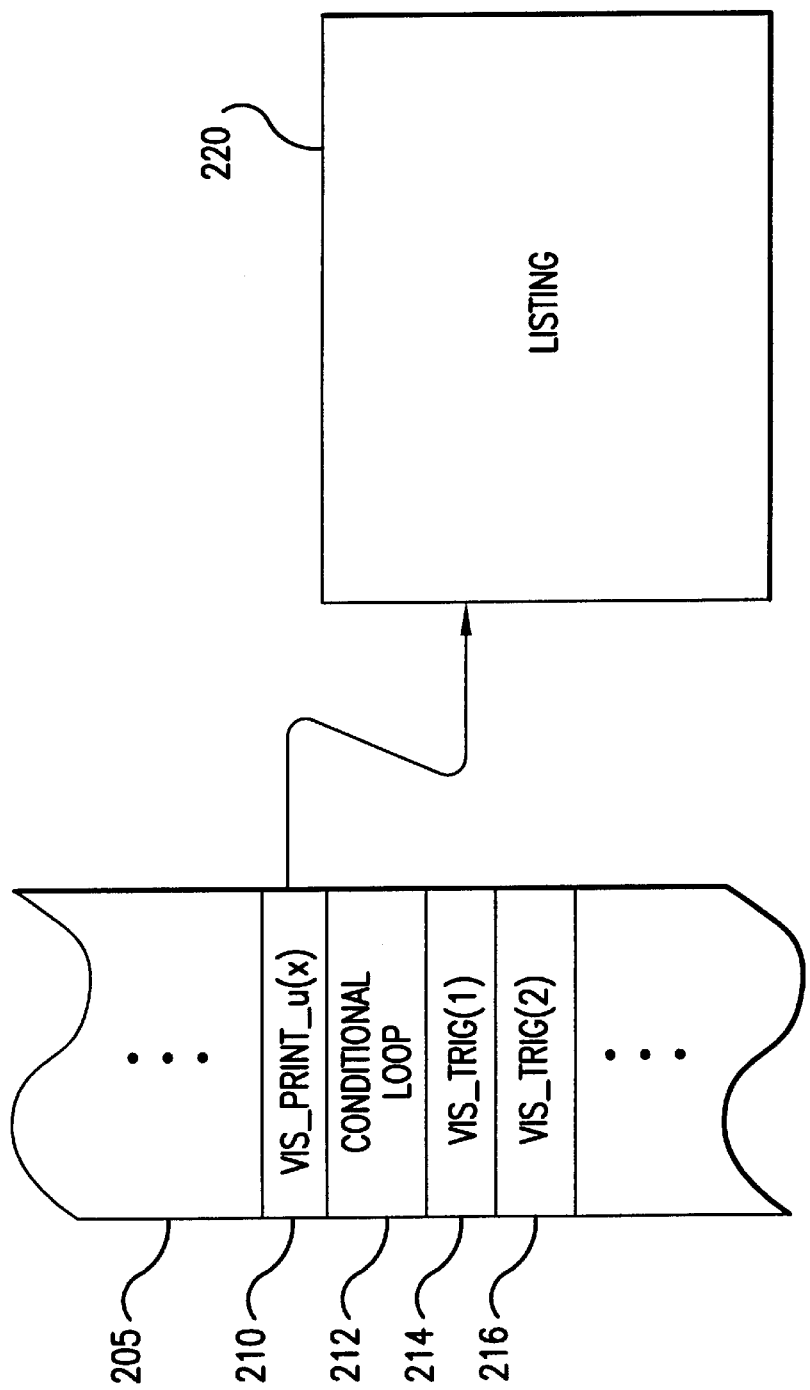
FIG. 2 shows a sample software trace using data visibility macros.

FIG. 2 shows an example of a software trace using a data visibility macro. The software listing 205 shows that the data visibility macro, vis_print_u(x), (item 210) has been inserted with a conditional loop 212. Based upon some condition, either vis_trig(1) 214 or vis_trig(2) 216 will trigger, causing a high-level code listing 220 to be displayed, correlating to the execution of the data visibility trigger (either item 214 or item 216).

While the present invention has been illustrated and described in connection with the preferred embodiments, it is not to be limited to the particular structures shown. It should be understood by those skilled in the art that various changes and modifications may be made within the purview of the appended claims without departing from the true scope and spirit of the invention in its broader aspects.

APPENDIX A

DATA VISIBILITY MACROS ACCORDING TO THE PRESENT INVENTION

The vis_print_?(a) macro
    The vis_print_?macros provide a way to print the value of data in variable formats.
    vis_print_u(a) : prints value as an unsigned integer
    vis_print_i(a) : prints value as a signed integer
    vis_print_o(a) : prints value in octal format
    vis_print_x(a) : prints value in hexadecimal format
    vis_print_b(a) : prints value in binary format
    vis_print_c(a) : prints value as a character
    vis_print_p(a) : prints value as a pointer (note:
    if the pointer matches an address in the symbol database, the symbol will be displayed, else the address will be displayed)
The vis_print_s?(a) macro
    The vis_print_s(a) macro acts like the
vis_print_?macros, except it permits a string to be captured and displayed.
The vis_print_task(a) macro
    The vis_print_task(a) macro can be used to signify the beginning and end of RTOS tasks. Each task can contain one or more of these macros and each macro can print a different value.
The vis_print_trig(a) macro
    The vis_trig(a) macro can be used to set up a complicated trigger in the code. A logic analyzer trigger sequence can be hard to setup, especially for a situation in which the developer only wants to trigger the analyzer for a very specific condition.

What is claimed is:

1. A method for retrieving data values from a processor using a logic analyzer, the method comprising:

(1) inserting a data visibility macro into software code, the code resident in the processor, reserving an array in memory, and setting an offset from a starting address within the array to which the data visibility macro will write the data values;

(2) compiling the code;

(3) the data visibility macro writing the data values to the offset in the array via an external bus; and (4) retrieving the data values from the external bus using a logic analyzer; and (5) in response to the logic analyzer retrieving the data values and detecting addresses of the offset on the external bus, the logic analyzer performing an operation determined by the offset.

2. The method of claim 1, wherein the data values result from data operations that occur internally in the processor.

3. The method of claim 1, wherein the operation performed by the logic analyzer is displaying the data values in a format determined in accordance with the offset.

4. The method of claim 3, wherein the format indicated by the offset is a binary format.

5. The method of claim 3, wherein the format indicated by the offset is a decimal format.

6. The method of claim 1, wherein the operation performed by the logic analyzer is the logic analyzer triggering in response to retrieving the data values and detecting addresses of the offset on the external bus during a clock cycle of the processor.

7. The method of claim 6, wherein the data visibility macro is nested within one or more conditional statements of the software code, thereby allowing the logic analyzer to trigger only when the one or more conditional statements are satisfied.

8. The method of claim 1, wherein the data values are predetermined data values.

9. A method for retrieving data values from a processor using a logic analyzer, comprising:

(1) inserting a plurality of data visibility macros into software code, the code resident in the processor, reserving an array in memory, and setting a plurality of offsets from a starting address within the array to which the data visibility macro will write the data values, wherein each offset of the plurality of offsets corresponds to a data visibility macro of the plurality of data visibility macros;

(2) compiling the code;

(3) for a data visibility macro of the plurality of data visibility macros, comprising:

a) writing a corresponding set of data values of the data values to a corresponding offset of the plurality of offsets within the array via an external bus;

b) a logic analyzer retrieving the corresponding set of data values from the external bus; and c) in response to the logic analyzer retrieving the corresponding set of data values and detecting addresses on the external bus of the corresponding offset in the array, the logic analyzer performing an operation determined by the corresponding offset; and (4) repeating (3) for each data visibility macro of the plurality of data visibility macros as needed.

10. The method of claim 9, wherein the data values result from data operations that occur internally in the processor.

11. The method of claim 9, wherein the operation performed by the logic analyzer is displaying the corresponding set of data values in a format determined in accordance with the corresponding offset of the data visibility macro.

12. The method of claim 11, wherein the format indicated by the corresponding offset is a binary format.

13. The method of claim 11, wherein the format indicated by the corresponding offset is a decimal format.

14. The method of claim 9, wherein the operation performed by the logic analyzer is the logic analyzer triggering in response to retrieving the corresponding set of data values and detecting addresses of the corresponding offset on the external bus during a clock cycle of the processor.

15. The method of claim 14, wherein the data visibility macro is nested within one or more conditional statements of the software code, thereby allowing the logic analyzer to trigger only when the one or more conditional statements are satisfied.

16. The method of claim 9, wherein the data values are predetermined data values.

* * * * *